United States Patent [19]

Hull et al.

[11] Patent Number: 4,961,849
[45] Date of Patent: Oct. 9, 1990

[54] MAGNETICALLY ATTACHED FILTER

[76] Inventors: Harold L. Hull, 401 Canyon Way, SP43, Spanks, Nev. 89434; Allen Klingamen, 1242 Glendale, Spanks, Nev. 89431

[21] Appl. No.: 286,340

[22] Filed: Dec. 19, 1988

[51] Int. Cl.$^5$ .................. B01D 39/08; B01D 29/01
[52] U.S. Cl. ........................ 210/169; 210/222; 210/232; 210/495; 210/496; 210/499; 55/495; 55/507; 55/511; 55/514; 55/527; 55/DIG. 6; 55/DIG. 31
[58] Field of Search .......... 55/100, 495, 507, 511, 55/513, 514, 527, DIG. 6, DIG. 31, DIG. 45; 210/222, 223, 232, 500.26, 500.42, 495, 496, 499, 162, 163, 169; 98/2.11, 2.16; 160/DIG. 1, DIG. 2, DIG. 16, 354; 4/286, 292

[56] References Cited

U.S. PATENT DOCUMENTS

| | | | |
|---|---|---|---|
| 1,171,138 | 2/1916 | Quagliano | 55/DIG. 6 |
| 2,595,833 | 5/1952 | Flaherty | 55/DIG. 6 |
| 2,959,832 | 11/1960 | Baermann | 210/222 |
| 2,999,275 | 9/1961 | Blume | 210/222 |
| 3,003,581 | 10/1961 | Greason | 55/514 |
| 3,124,725 | 3/1964 | Leguillon | 55/DIG. 6 |
| 3,136,720 | 6/1964 | Baermann | 210/222 |
| 3,382,985 | 5/1968 | Muehl | 210/495 |
| 3,679,505 | 7/1972 | Hinderaker et al. | 160/DIG. 16 |
| 3,912,473 | 10/1975 | Wilkens | 55/DIG. 6 |
| 3,941,034 | 3/1976 | Helwig et al. | 55/511 |
| 4,470,834 | 9/1984 | Fasanaro et al. | 55/DIG. 6 |
| 4,724,749 | 2/1988 | Hedrick | 55/DIG. 6 |

Primary Examiner—W. Gary Jones
Assistant Examiner—Mathew D. Savage

[57] ABSTRACT

A filter or filter assembly in which at least the frame work is made of magnetic material which holds the filter or filter assembly in place without the need of hardware and which is easily removed for cleaning or changing. The applications or numerous such as vehicle vents, swimming pools, spas, radiator covers, or any opening which needs to be filtered which has a metal frame work or opening.

4 Claims, 1 Drawing Sheet

MAGNETICALLY ATTACHED FILTER

This invention relates to filters and means to attach various types of filters to a vent or opening.

BACKGROUND OF THE INVENTION

Filters and means to attach filters are not new and a number of means have been taught by the prior art such as filters being housed in a frame, container, or compartment and attached to an opening or vent by means of screws, fasteners or the like.

When it becomes necessary to change or clean such filters, they must be removed from their frames, container or compartment, generally by the use of tools which are necessary to remove shrews, fasteners, lids, covers and the like, and generally require the services of a trained specialist.

Because of the un-accessibility of most filters, the filters are many times allowed to accumulate accessive dust, dirt and foreign material until they are clogged or so full of foreign matter that they restrict the normal passage of air or fluid being filtered and can cause expensive mal-function of expensive equipment and unsatisfactory performance by the equipment.

OBJECTS AND ADVANTAGES

It is an object of our invention to provide a filter made of or mounted on or within a frame structure of magnetic impregnated material such as magnetic impregnated vinyl such as is provided by the Magnet Store of Castle Rock, Colo. and known by the trademark "ZIP-GRIP" or other suitable magnetic material as is used in magnetic signs or the like.

It is a further object to provide a filter assembly which can easily be made from bonding a suitable filtering material such as spun glass, or fiber glass screen such as "SCOTCH-FOAM" to the frame of magnetic impregnated material such as "ZIP-GRIP" in a number of configurations and shapes to cover any appropriate opening or vent which needs to be filtered.

It is still another object to provide a filter assembly which is attached to an opening or vent by magnetic means alone, thus eliminating any frames or hardware to hold said filter assembly in place.

It is yet another object to provide a filter assembly which can be easily accessible for cleaning without removing any hardware and without the use of tools.

Still another object is to provide a filter assembly which can be quickly and easily removed and stored to prevent theft of the filter assembly.

Another object and advantage is to provide a filter assembly which can be used seasonally and stored when not in use.

Yet another object is to provide a filter assembly which may be used under water and attached magnetically to a grate or screen such as swimming pools or spas or the like which can easily be replaced or cleaned under water without the use of tools, by an un-skilled person.

Still another object and advantage is to provide a filter assembly which may be used on the outside air vent of a vehicle which is generally located below the windshield and which can be attached without any hardware such as screws and which is non-abrasive by nature so no damage will be done to the finish of the vehicle and is so designed as to lay around the windshield wiper assemblies and is held magnetically in place so that wind at high speeds will not blow the assembly off of the vehicle. In tests performed by the inventors, the filter assembly when made of "ZIP-GRIP" and "SCOTCHFOAM" remained in place at high speeds as "ZIP-GRIP" exerts 1 lb. per. sq. inch of magnetic attraction.

It is still another object to provide a filter assembly which may be placed over the intake side of a vehicle radiator to catch "bugs" and dust which may be easily washed or shaken out periodically without removing any hardware.

Yet another object is to provide a one piece filter or screen made of magnetic material and perforated in the areas necessary to provide filtration or screening.

SUMMARY OF THE INVENTION

In accordance with the present invention a filter assembly is made by either bonding the filter material to one side of the magnetic vinyl or "sandwiching" and bonding the filtering material between two pieces of magnetic vinyl and shaping the outer edges of the magnetic vinyl to fit the contour of the opening or vent, thus allowing the magnetic force of the magnetic vinyl to hold the assembly in place and allowing the filtering material to filter the air or fluid as necessary.

Figure 1:
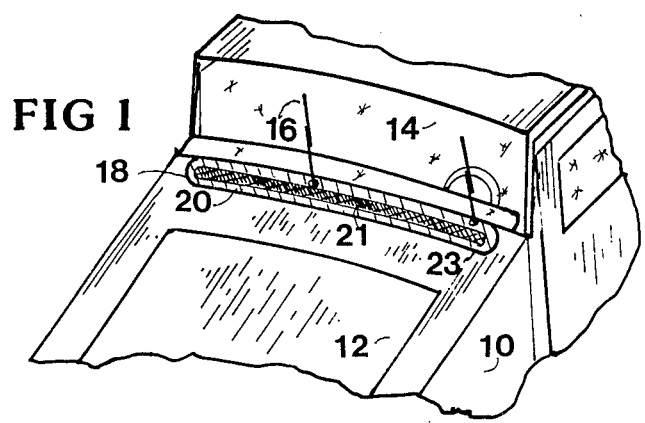
FIG. 1 is a perspective view of a vehicle intake air vent located below the windshield and behind the hood opening and covered by our magnetically attached filter assembly.
Figure 2:
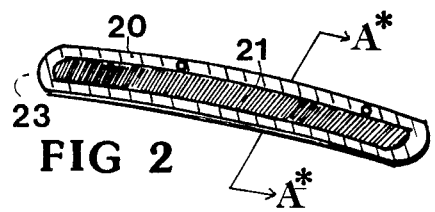
FIG. 2 is a perspective view of our filter assembly.

DETAILED DESCRIPTION OF THE DRAWINGS 10 is a vehicle with 12 being the hood and 14 is a windshield with windshield wipers 16 while 18 is an intake air vent which is covered by 23 (our magnetically attached filter) which is made up of a frame of magnetic impregnated vinyl 20 and filtering material 21, the two being bonded together with suitable bonding material, while 25 is also filtering material and 27 is magnetic impregnated vinyl while 29 shows 25 and 27 bonded together with suitable bonding material, while 30 is magnetic impregnated vinyl or other suitable magnetic material and perforated by multiple serrations such as the holes shown by 32.

OPERATION

It will be seen that in the preferred embodiment of FIG. 1 that when the assembly 23 is placed over the vent 18 of the vehicle 10, that the assembly is releaseably held by the force of magnetism in the magnetic impregnated vinyl 20 of the assembly and seals the vent 18 on its outer perimeters so that all the incoming air must travel through the filter portion 21 of the assembly 23.

It will also be seen that the assembly 23 can be easily removed for cleaning or for safe keeping as it is readily accessible and needs no tools to remove it.

It will be seen that we also have provided a simple filter which may be used seasonally or at will and may be removed and cleaned or washed at a car-wash along with mats, etc.

It is also to be understood that we have provided an assembly that can easily be placed over the exterior of the vent without abrasive action occurring.

Also the assembly may be made Of any number of colors to attractably blend in with the natural color of the vehicle.

It may also be made in a number of shapes to fit any vent on any model of vehicle.

Figure 3:
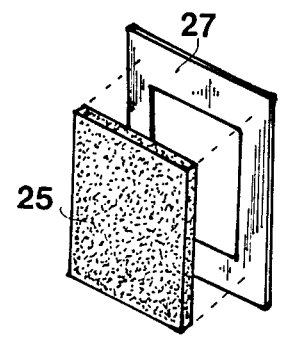
FIG. 3 is a blown-up perspective view of another embodiment of a filter assembly.
Figure 4:
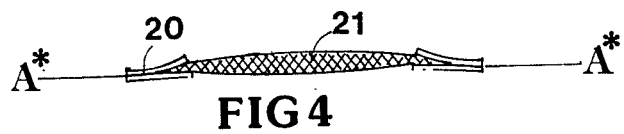
FIG. 4 is a sectional view at A*—A* of FIG. 2.
Figure 5:
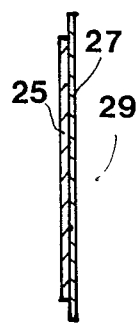
FIG. 5 is a side view of FIG. 3.

In the embodiment shown in FIGS. 3 and 5, the assembly is shown with the filter 25 being attached to one side of the vinyl 27 and may be used for a number of applications such as swimming pool vents, vehicle radiators, cooling systems involving filtration and a host of other applications.

Figure 6:
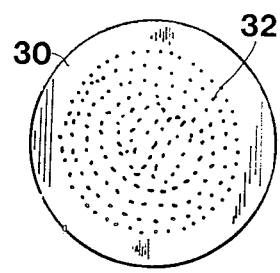
FIG. 6 is a frontal view of a screen or filter made of magnetic material.

In the embodiment shown by FIG. 6 the magnetic impregnated vinyl 30 or other suitable magnetic material is itself perforated by holes 32 which acts as a screen or filter and this embodiment needs no assembly as it is made of one continuous piece of magnetic material.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by letters patent is:

1. A magnetically attached filter comprising sun glass filter means, frame means attached to said filter means, said frame means consisting essentially of magnetic impregnated vinyl and means to attach said frame to said filter.

2. The device of claim 1 in which said means to attach said frame means to said filter means is cement.

3. The device of claim 1 in which said means to attach said frame means to said filter means is stitching.

4. The device of claim 1 in which said frame means consists of a first piece and a second piece and wherein said filter is attached between said first piece and said second piece via the attaching means.

* * * * *